US006809647B2

(12) United States Patent
Mazzarolo

(10) Patent No.: US 6,809,647 B2
(45) Date of Patent: Oct. 26, 2004

(54) INFORMATIVE DATA IDENTIFYING DEVICE FOR SPECTACLES

(76) Inventor: Valter Mazzarolo, Via Roma 21, 32040 Domegge, (BL) (IT)

( * ) Notice: Subject to any disclaimer, the term of this patent is extended or adjusted under 35 U.S.C. 154(b) by 138 days.

(21) Appl. No.: 10/082,979

(22) Filed: Feb. 25, 2002

(65) Prior Publication Data

US 2003/0160737 A1 Aug. 28, 2003

(51) Int. Cl.[7] .............................................. G08B 23/00
(52) U.S. Cl. ............................. 340/573.1; 340/573.4; 340/572.1
(58) Field of Search ..................... 340/573.1, 573.4, 340/572.1, 572.4, 572.7, 572.8, 571, 870.17, 10.1, 10.2, 10.42; 342/44, 51; 705/1, 29

(56) References Cited

U.S. PATENT DOCUMENTS

| | | | | |
|---|---|---|---|---|
| 4,517,563 A | * | 5/1985 | Diamant | .................. 340/10.42 |
| 5,144,314 A | * | 9/1992 | Malmberg et al. | ............ 342/44 |
| 5,732,401 A | * | 3/1998 | Conway | ...................... 705/295 |
| 6,346,886 B1 | * | 2/2002 | La Huerga | ................ 340/573.1 |
| 6,366,206 B1 | * | 4/2002 | Ishikawa et al. | ......... 340/573.1 |

* cited by examiner

Primary Examiner—Van T. Thieu
(74) Attorney, Agent, or Firm—Bucknam and Archer

(57) ABSTRACT

Informative data identifying device for spectacles, adapted to permit informative data of any kind concerning the spectacles to be identified by utilizing a device associated with a display. A device comprising a circuital element (6, 8; 25) is arranged on the spectacles and interconnected with a receiver-transmitter device (11, 29) and the display (12), the circuital element (6, 8; 25) being adapted to receive, store and manage the informative data of the spectacles, as coded informations, which have been set on the receiver-transmitter device (11, 29) and displayed on the display (12), and an additional circuital device (8, 30) interacting with the circuital device (6, 8; 25) and being adapted to detect the informative data of the spectacles which have been stored and managed on the circuital device (6, 8; 25), by transferring them toward the receiver-transmitter device (11, 29) for recognizing and managing such informative data with the aid of the display (12).

21 Claims, 4 Drawing Sheets

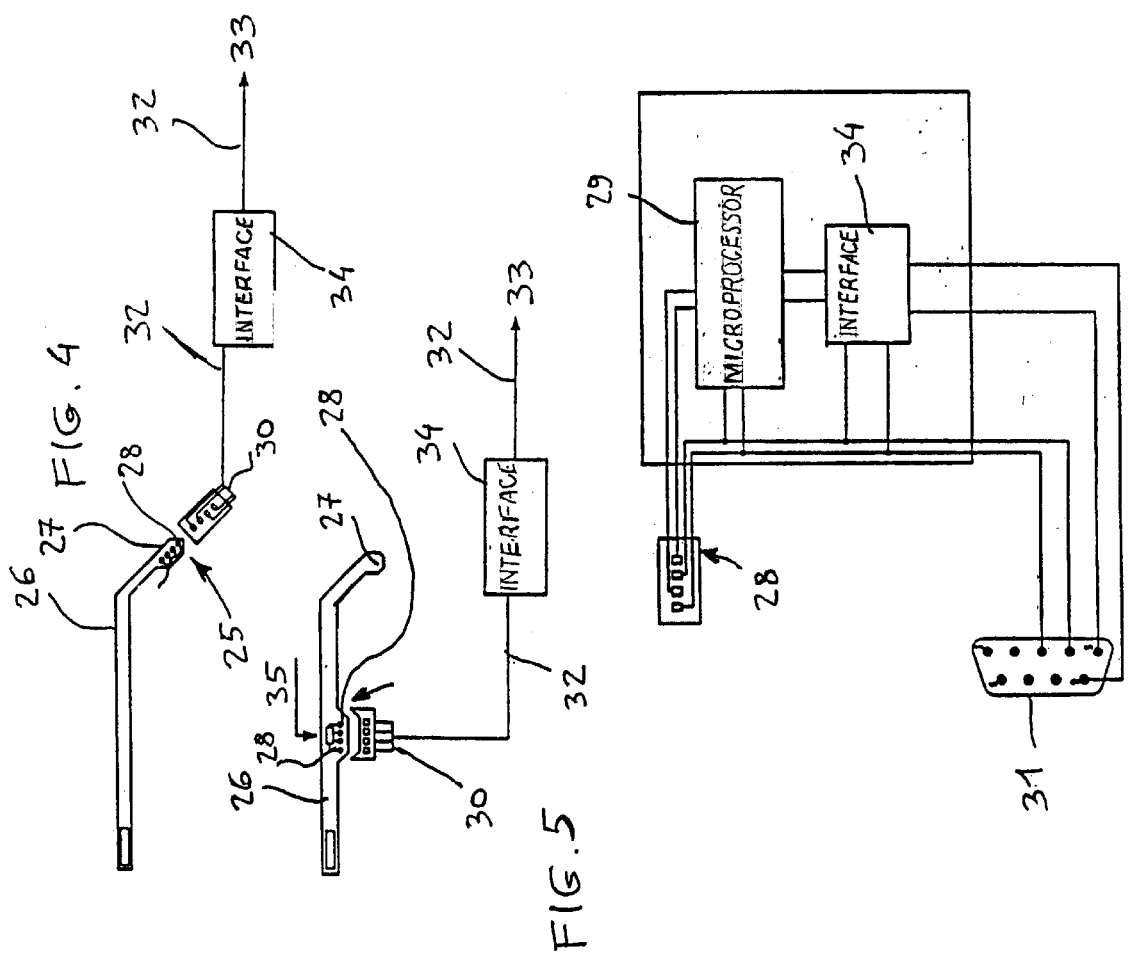

INFORMATIVE DATA IDENTIFYING DEVICE FOR SPECTACLES

BACKGROUND OF THE INVENTION

The invention relates to an informative data identifying device for spectacles, adapted to permit the structural composition of the different component parts and the relative manufacturers of spectacles of any kind to be identified in a simple, quick and safe manner. The invention also relates to a receiver-transmitter device, adapted to permit these informative data for spectacles to be transmitted and received.

At the present time, the spectacles of different kind are made by utilizing a set of component parts of conventional kind, which are manufactured and assembled together in the manufacturing factories, and which are made available from the different manufacturers for any replacement or repair of corresponding component parts which are defective, broken or have been lost relating to already used spectacles, in order to guarantee the users of the availability of original component parts, so as to re-establish a correct operation of the spectacles. The design, programming and management of the production and sales of the different kinds of spectacles is effected by utilizing processing devices such as computers and the like, and these operations are performed by inputting the required data in the processing apparatuses and transmitting the informative data of these operations to further apparatuses of the same kind, which data serve to prepare the needed productions and to organize the sales of spectacles to the various customers. However, in the practice it can happen that the needed original component parts for spectacles cannot be always found, or that component parts of other manufacturers are used, which aren't suitable to perform the same function of the parts to be replaced, with consequent difficulty to re-use correctly the spectacles and sometimes impossibility to re-use the spectacles, which fact is particularly disadvantageous in presence of spectacles with high quality and worth from the economic point of view, and would involve the need to find and buy a new spectacle of the same kind required. Moreover, at the present time provisions which certainly ensure that the spectacles available on the market are coming actually from the respective manufacturers indicated on the same spectacles aren't existing, since there are often found spectacles which have been counterfeit and imitate illegally the spectacles actually producted by the indicated manufacturers and which are believed to be original spectacles, which facts can involve serious economic and penal consequences for the buyers thereof. Besides, if on the one hand the use of the processing apparatuses makes it possible to input and manage all the needed operations for manufacturing and selling the spectacles, on the other hand it as not yet been made available a system permitting to utilize these processing apparatuses even for identifying some informative data concerning the spectacles, for the same reasons as above.

SUMMARY OF THE INVENTION

Therefore, it would be hoped and is the object of the present invention, to make available for the users the spectacles which are made in such a manner that to permit the different component parts and the actual manufacturers of the same spectacles to be safely and quickly identified. These objects and other ones are attained, in accordance to the present invention, by means of an informative data identifying device for spectacles made with the described constructive features, with particular reference to the enclosed patent claims.

BRIEF DESCRIPTION OF THE DRAWINGS

The invention will be better understood from the following description, given solely by way of not-limiting example and with reference to the accompanying drawings, wherein:

FIG. 4 shows a schematic view of the structural composition of the informative data identifying device according to the invention, in a second embodiment thereof, FIG. 5 shows a schematic view of the structural composition of the present device in a third embodiment thereof;

FIG. 6 shows the block diagram of a component part of the identifying device of FIG. 4.

DETAILED DESCRIPTION OF THE INVENTION

Figure 1:
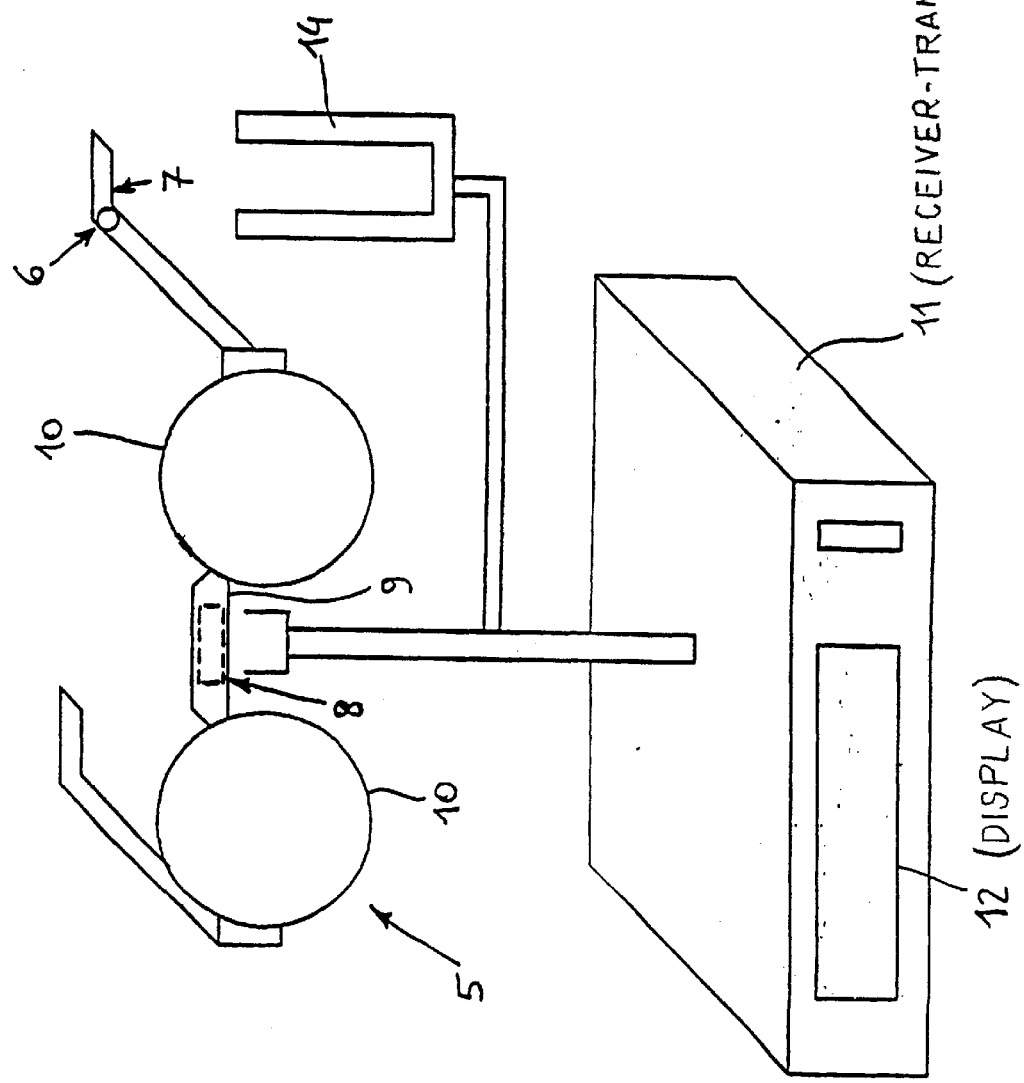
FIG. 1 shows a schematic view of the composition of an informative data identifying device for spectacles according to the invention, associated with a spectacles of conventional type, and made in a first embodiment thereof.
Figure 2:
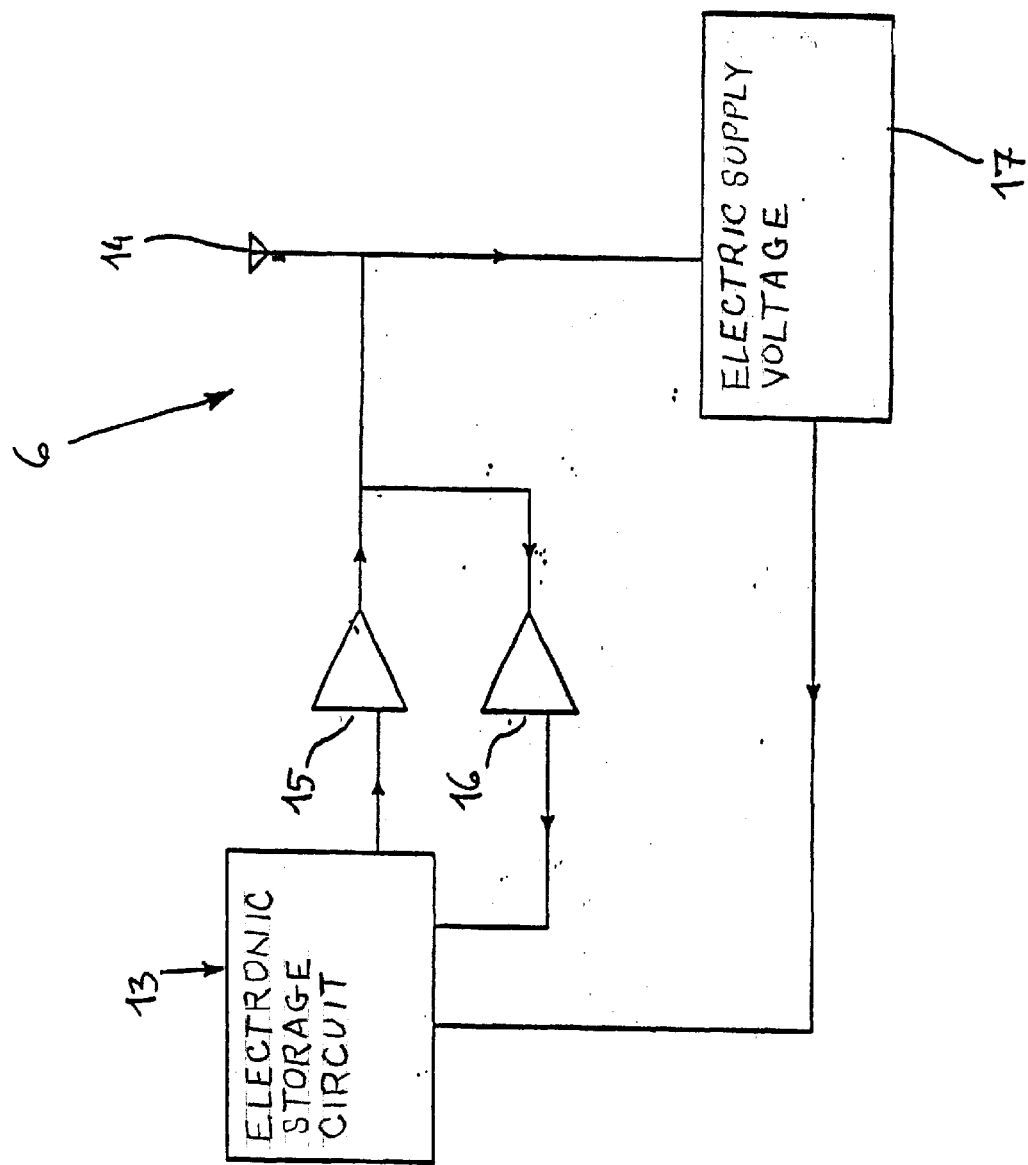
FIG. 2 shows the block diagram of a component part of the receiver-transmitter device of FIG. 1.

In the above mentioned Figures it is represented schematically an informative data identifying device for spectacles according to the invention, adapted to permit the different component parts of the spectacles and the data concerning the production and distribution of the spectacles as well as possible further data of interest for the same spectacles to be safely and quickly identified. By way of example only, this device may identify data relating to the component parts employed in the structural composition of spectacles (like the size, the degree and diopters of the lenses employed), the name of the manufacturer, the distributing agent (and the relative sale price) and the owner of the spectacles, and the origin of the spectacles (so as to protect the manufacturer against falsifications and imitations thereof) as well as some data of any other kind which may distinguish the different kinds of spectacles available on the market. Such data may be stored either directly inside the identifying device provided on the spectacles or such device stores exclusively an identifying code, while the data concerning this code are stored on an outer system such as a personal computer and any other electronic device capable of storing data. With reference to the FIG. 1, a data identifying device according to a first embodiment thereof associated with a spectacles 5 of conventional type is illustrated schematically, wherein this device is provided for transmitting and receiving informative data toward and from the spectacles, it is noted that this receiver-transmitter device is substantially constituted by at least a circuital element 6 made preferably in the form of an inductive integrated circuit with integrated storage, having a reduced size, and made as it will be described, and commonly known with the name of transponder which is housed, included or applied in the spectacles 5 at any position therein, for example inside the one of its rods or the terminal portion of such spectacles, in the present case the terminal portion 7, or also on different positions outside the same spectacles, such integrated circuit being made like a chip and performing the functions to transmit and receive informative data concerning the spectacles in the manner and for the purposes hereinafter described. FIG. 1 also shows the above mentioned circuital element which has been placed at another position inside the spectacles, for example inside the nose resting support 9 joining the lenses 10 of the spectacles, and in the present case is marked with the reference numeral 8 and always performed as a transponder. The informative data concerning the spectacles are transmitted to and received from such circuital element 6 or 8 (transponder) through an antenna 14, and these data are stored and managed by a device 11, so set as to be able to input the data onto said circuital element and to read the data of this latter, which device can be in case provided with a display for displaying the data, and this device can be connected remotely with a data storage and management device such as for example a personal computer or can be provided with both the display and the remote connection. By referring always to FIG. 1, it is noted that such receiver-transmitter device is associated with a device 11 made as a reader-writer device 11, so set as to transmit to the receiver-transmitter device 6 or 8 (or to the receiver only in the case in which the circuital element 6 or 8 is designed as writer only) coded informations as digital informations relating to the different identifying data of the spectacles onto which the same device is arranged, which have been described previously, and to receive from such receiver-transmitter device coded informations as digital informations relating to the informative data of the same spectacles, said receiver-transmitter device being also able to be associated optionally with at least a display 12, preferably of a liquid crystals type, for displaying the different identifying data of the spectacles. Moreover, such receiver-transmitter device 11 may be also provided with a connection with remotely arranged devices such for example a personal computer or the like and this connection may be effected either by a serial cable 232 (not shown) or a parallel gate or any other kind of connection (by cable or air) adapted to permit a communication among different electronic apparatuses. Reference is now made to the FIG. 2, in which the circuital block diagram of the circuital element 6 or 8 is illustrated, it is noted that this is constituted substantially by at least an electronic circuit 13 formed by a storage adapted to contain the identifying code of the same circuital element transponder and in case also the data relative to the same spectacles, in the case in which this device is designed as reader-writer. This circuital element 6 is made with chips transponder commonly available on the market for performing the function of data management and storage. By way of example only, it may be made with one of the integrated circuits transponder of the following manufacturers: Microchip, Atmel, Temic, Sokymat, but of course also integrated circuits of other kinds and manufacturers may be used, for performing the same functions, provided that obviously such integrated circuits are suitable and compatible with the processing of the needed informative data.

Moreover, such circuital element 6 or 8 is constituted by at least an antenna 14 (see also FIG. 1), composed preferably of air wound turns made of metallic wire, which are enclosed in the chip body, which antenna is operatively connected to the electronic circuit 13 through at least a transmitter circuit 15 and a receiver circuit 16 of the identifying data of the spectacles referred to, coded as digital informations, which circuits are arranged in parallel from each other, of which the transmitter circuit is adapted to transmit the identifying data of the spectacles, stored on the electronic circuit 13, toward one or more data processing apparatuses connected downstream, in the present case the device 11 and the possible display 12, through the antenna 14, in order to permit these data to be identified, and the receiver circuit is adapted to transmit to the electronic circuit 13 the identifying data received through the antenna 14 and set on the device 11 as well as displayed on the possible display 12, in response to the identifying data stored and managed on the electronic circuit 13 and transmitted through the above mentioned transmitter circuit. The transmission frequency of the coded information depends on the chip model which has been employed. This circuital element 6 or 8 is further constituted by at least an electric supply 17 of per se known type, connected operatively to both the electronic circuit 13 and the antenna 14, and so made as to generate, depending on the electromagnetic field picked up outside by the antenna 14, a weak electric signal sufficient to supply all the circuits of the circuital element 6. In this way, an autonomous electric supply for the circuits of the present receiver-transmitter device is attained, which permits the expensive and cumbersome batteries of the structure of the spectacles to be eliminated.

Figure 3:
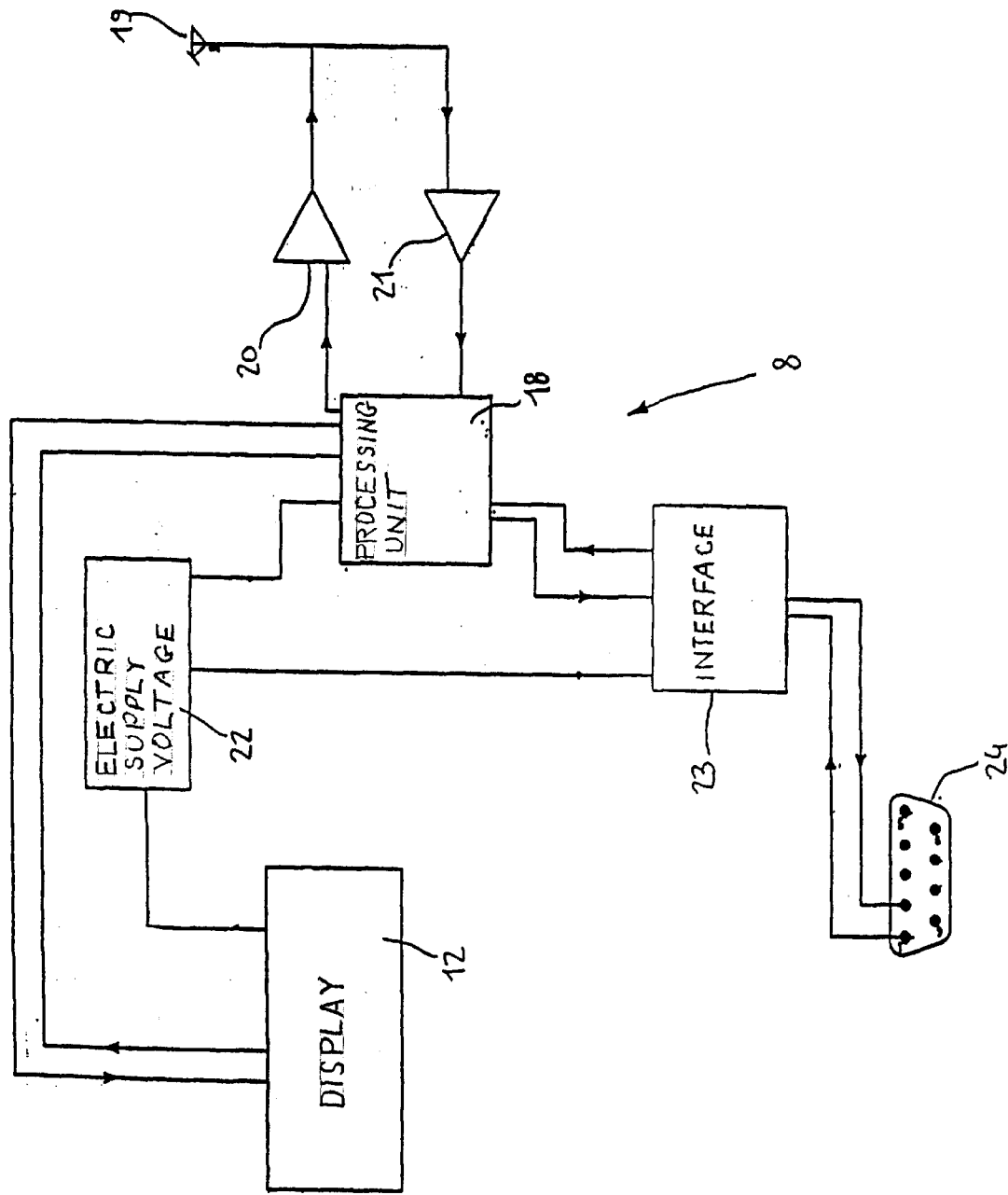
FIG. 3 shows the block diagram of a further component part of the device of FIG. 1.

In turn, the device 11 (see also FIG. 3) is also made with chips commonly available on the market for performing the function of reader of the data stored and managed on the electric circuit 13 of the circuital element 6 or 8, and to transmit and receive such data in the manner and for the scopes hereinafter described. By way of example only, it may be made with the different integrated circuits of the following manufacturers: Microchip, Atmel, Temic, but of course also integrated circuits of other kinds and manufacturers may be used, for performing the same functions, provided that obviously such integrated circuits are suitable and compatible with the processing of the needed informative data. Such device is constituted substantially by at least a processing unit 18 formed by a microprocessor or a microcontroller, which is so programmed as to manage the informations received from the circuital element 6 or 8 and adapted to activate and de-activate the operation of the circuital elements 6 or 8 and 21 and 22, which will be described later, as well as to manage the informations coded as digital informations relative to the identifying data of the spectacles in which this circuital element is arranged, which data are transmitted toward the circuital element 6 or 8 and received from this latter, and are also transmitted toward the possible display 12. Such processing unit 18 is connected operatively, either directly or through a proper integrated circuit including a transmitter 20 and a receiver 21 as well as a circuit adapted to receive the data from the circuital element 6 or 8 and code them in such a manner as to be suitable for the processing unit 18, with an antenna 19 composed preferably of air wound turns of metallic wire, which are enclosed on a proper container (not shown) and preferably approached with the turns of the antenna 14 of the circuital element 6 or 8, and this connection is effected through at least a transmitter circuit 20 and a receiver circuit 21 of the identificative data of the spectacles referred to, coded as digital informations, which circuits are arranged in parallel to each other, of which the transmitter circuit is adapted to transmit to the electronic circuit 13 of the circuital element 6 or 8, through the antenna 19, the identifying data of the spectacles set with the device 11 and displayed on the possible display 12, in order to permit said identifying data to be in case stored into said electronic circuit, and the receiver circuit is adapted to transmit to the processing unit 18 the identifying data received through the antenna 19 and coming from said electronic circuit of the circuital element 6 or 8. Moreover, this device 11 is constituted by at least an electric supply 22 of per se known type connected operatively to the processing unit 18, the possible display 12 and the interface 23 (of which the interface shown in FIG. 3 has been indicated as a serial cable 232 or 485, but may be any interface adapted to permit the communication between two electronic apparatuses), for communicating with a remote device (for example a personal computer) as well as the integrated circuit including the transmitter and receiver circuits 20 and 21 or, in the case in which such an integrated circuit doesn't exist, directly with the transmitter 20 and the receiver 21. Finally, such device 11 is constituted by at least an interface 23 of per se known type, connected operatively to the processing unit 18, the electric supply 22 and an electric plug 24, permitting it to be connected with a standard connection through a serial cable with computers of various kind (office, portable computers, set of computers etc.) or further interfaces (not shown) for the connection with internet and the like. Normally, depending on the used type of serial cable, such connection occurs by means of a transmission type RS 232 or 485, but of course may be obtained also with the more different types of transmission. Such an interface is adapted to determine the transmission of identifying data of the spectacles from a remote device toward the processing unit 18 of the device 11, and from this latter toward the electronic circuit 13 of the circuital element 6 or 8, and to receive the response identifying data provided by such electronic circuit with a path in an opposite direction with respect to the preceding direction, in order to detect and recognize these identifying data.

Therefore, it appears evident the operation of the informative data identifying device according to the invention. In fact, thanks to the fact to be included on the spectacles, this device permits to receive, when the spectacles are buyed, the coded identifying data of this latter which have been set on the computer 11 and displayed on the possible display 12, and these informative data are in case stored on the storage of the electronic circuit 13 of the circuital element 6 or 8, or associated to the identifying code of the circuital element 6 or 8. It also permits the identifying data detected and read on the above mentioned storage and managed by the electronic circuit 13, to be transmitted at any moment and place to the device 11 and the possible display 12, through the processing unit 18 of the circuital element 6 or 8, thereby permitting to the computer to recognize safely these identifying data distinguishing the spectacles. Therefore, this detection permits to identify the constructive components of the spectacles, which in the case of operative defects, breakage or mislaying thereof, may be found at other sides and utilized as original components, and such finding could be for example effected by an optician who, after having read the identifying data of the spectacles as described above, by means of a software may connect himself to internet from which the names of the suppliers of the spare parts may be found, to whom suppliers the spectacles may be in case sent for the replacement or repair of the components thereof. Likewise, in the case in which the spectacles have been lost, this operation permits to identify the name of the owner to whom the same spectacles can be given back. Furthermore, this provision makes it possible to identify without any possibility of mistake, the name of the manufacturer of the spectacles and to recognize the original product, thereby avoiding any counterfeiting and imitation thereof. With reference to the FIG. 4, shown schematically therein is now a data identifying device according to the invention, in a second embodiment thereof, from which it is noted that this device is substantially constituted by at least a circuital element 25 made preferably as an integrated circuit with integrated storage, having reduced sizes, which is made as it will be described and is housed, included or applied on the spectacles at any position thereof, in the present case on the terminal portion 27 thereof, such an integrated circuit being made like a chip provided with a set of electrical contacts 28 for being supplied and for transmitting the informative data, and performing the function to receive and transmit informative data concerning the spectacles, in the manner and for the scopes hereinafter described. Moreover, such circuital element includes one or more data processing devices which are associated with these storages and constituted for example by at least a microcontroller, a microprocessor, FPGA, PAL, GAL using any communication system, which devices may be made separately and outside the storage and the spectacles, as in the illustrated case, or also as integrated circuit including both the storage and the data processing device which is included on the spectacles. The object of this data processing device, which may be associated also with further data processing devices of the same kind, is that to process the informative data which are transmitted to the storage of the circuital element 25 and from this latter toward the processing apparatuses, so as to permit these data to be recognized and manipulated in the desired manners. The present data identifying device is also constituted by at least a further circuital element 30, separated from the circuital element 25 and which can be connected therewith, which is made as a multipolar electric connector 31 adapted to be coupled with both the storage and the data processing device of the circuital element 25, in the present case it is coupled with the corresponding electric contacts 28 and is connected operatively with the data processing device by means of a cable 32 provided with a set of electrical conductors, in order to determine both the electrical supply of said circuital element and an exchange of informative data therewith.

Such an electric connector 31, moreover, is connected by means of the cable 32 with one or more processing apparatuses 33 like computers and the like, through at least a suitable interface 34, so as to permit the transmission of the informative data concerning the spectacles, coded as digital informations, from such processing apparatuses toward the circuital element 25, for the storage and processing of these informative data on such circuital element, and from this circuital element 25 toward the processing apparatuses for reading and identifying as well as managing the data stored on the same element. By way of example only, the included storages of the circuital element may be of different kind, like static storages of serial or parallel type (ROM, EEPROM, flash storages and the like, dynamic and RAM storages and the like), in which storages the informative data relating to the spectacles are stored, which data have been set on the processing apparatuses, so as these informative data may be read and identified subsequently by the processing apparatuses. In the FIG. 6 there are shown said component parts composing the interface with the outside, namely a storage included in the chip 35 provided with a connector with electrical contacts 28 which can be coupled with the electrical contacts of FIG. 4 which are provided on the spectacles, and a data processing device like for example a microprocessor 29 also included on the chip 35 and performing the above mentioned functions, this latter being connected to an interface 34 of conventional type (i.e. RS 232 or of other kinds such as i.e. RS 485), such component parts being supplied electrically from the processing apparatuses or by means of a separated battery connected to the interface 34, or directly by the main electrical supply. Likewise, the electrical supply can be effected also through an outer fitting, such as for example a pliers (not shown) which is connected electrically to the connector 31 of FIG. 4 and is able to transmit and receive some informative data with respect to the present data identifying device and/or also to start pre-established programs which have been set in advance on the processing devices 29 of the present data identifying device. Therefore, thanks to the fact to be included partially of fully on the spectacles, this informative data identifying device permits to receive and store, when the spectacles are bought, the coded identifying data of the same spectacles, which have been set with the processing apparatuses, and also permits to transmit to the processing apparatuses (through the processing devices 29 and the interface 34, see FIG. 6) at any moment and place the identifying data which have been detected and read onto said storage and processed by the processing device 36, thereby allowing the processing apparatuses to recognize safely these identifying data distinguishing the spectacles. Therefore, this detection permits to identify the constructive components of the spectacles, for the above mentioned scopes, and such finding could be effected for example by an optician who, after having read the identifying data of the spectacles as described previously, by means of a software can connects himself to the internet, from which he can find the names of the suppliers of the spare parts, whom the spectacles may be in case sent for the replacement or repair of the components. Finally, FIG. 5 shows a third embodiment of the present data identifying device, which is always composed of the above mentioned constructive components, of which however the chip 35 of the storage of the circuital element 25 and the relative electrical contacts 28 are here not more positioned on the terminal portion of the spectacles, but rather onto one of the rods 26 thereof.

What is claimed is:

1. Informative data identifying device for spectacles, provided with lenses joined with a nose resting support and with rods having a terminal portion, the device being adapted to permit the informative data of the structural components, the names of the manufacturer and owner of the spectacles, and possible further data pertaining the same spectacles to be identified, by utilizing at least a device associated with display means, wherein circuital means are provided and arranged on said spectacles and interconnected with each other and said device, which is able to receive from and/or transmit to said circuital means coded informations relating to the informative data of the spectacles, and interconnected with said display means, said circuital means being adapted to receive, store and manage the informative data of the spectacles, as coded informations, which have been set with said device and displayed through said display means, and said device being interacting with said circuital means and adapted to detect the informative data of the spectacles which have been stored and managed onto said circuital means, so as to recognize and manage such informative data with the aid of said display means.

2. Identifying device according to claim 1, wherein said circuital means are constituted by at least an electronic circuit formed by a storage, and by at least an antenna and an electric supply connected operatively from each other and with said electronic circuit, said electronic circuit being so set as to manage the informative data inputting and outputting the spectacles onto which it is arranged, said antenna being adapted to receive the informative data set through said device, by transferring them toward said electronic circuit through at least a receiver unit, and to transfer the informative data from said electronic circuit toward said device through at least a transmitter circuit, and said electrical supply being adapted to generate, depending on the electromagnetic field picked up outside by said antenna, an electric signal sufficient to supply all the circuits of said circuital means.

3. Identifying device according to claim 2, wherein said receiver circuit and said transmitter circuit are arranged parallel to each other.

4. Identifying device according to claim 2, wherein said antenna is comprised of wound turns of metallic wire which are included on said electronic circuit.

5. Identifying device according to claim 4, wherein said circuital means is made of an inductive integrated circuit with integrated storage (transponder).

6. Identifying device according to claim 5, wherein said device is constituted by at least a processing unit formed by a microprocessor or a microcontroller, by at least an antenna, an electric supply and an interface connected operatively from each other and with said processing unit and said display means, said microprocessor or microcontroller being so set as to operate on the same transmission frequency of the informative data of said circuital means, by means of an integrated circuit of interface permitting to code the codes coming from said circuital means into a format compatible with said processing unit, and being adapted to activate and de-activate said circuital means and said device and to manage the transmission of the informative data, said antenna being adapted to receive informative data set through said device, by transferring them toward said electronic circuit of said circuital means, through said processing unit and at least a transmitter circuit, and to transfer the informative data coming from said electronic circuit toward said device, through said processing unit and at least a receiver unit, said electric supply being adapted to generate an electric signal sufficient to supply all the circuits and said interface being connected with said device through at least an electrical plug for standard connection with serial cable, and being adapted to permit the transmission of informative data from said device toward said circuital means and from these toward said device, in order to identify and set the same data.

7. Identifying device according to claim 6, wherein said transmitter circuit and said receiver circuit are connected in parallel to each other.

8. Identifying device according to claim 6, wherein said electrical plug is adapted to permit the connection also with internet through respective further interfaces.

9. Identifying device according to claim 6, wherein said informative data are coded as digital data.

10. Identifying device according to claim 6, wherein said antenna is composed preferably of air wound turns of metallic wire, which are enclosed onto a container and are preferably approached to the turns of the antenna of said circuital means.

11. Identifying device according to claim 10, wherein said device comprises one or more computers.

12. Identifying device according to claim 5, wherein said circuital means are housed, included or applied to the nose resting support, or rods or terminal portion or any position of the spectacles, or also on positions outside the spectacles.

13. Identifying device according to claim 1, wherein said circuital means are constituted by at least a storage and at least a data processing device forming said device, which are associated and can be supplied electrically, and which are adapted to receive, transmit and process informative data concerning the spectacles.

14. Identifying device according to claim 13, wherein said storage is included on an integrated circuit made as a chip, and said data processing device is separated from and arranged outside with respect to said chip.

15. Identifying device according to claim 14, wherein said storage and said data processing device are included on an integrated circuit.

16. Identifying device according to claim 15, wherein said circuital means are housed, included or applied to the nose resting support, or rods or terminal portion or any portion of the spectacles, or also on positions outside the spectacles.

17. Identifying device according to claim 14, wherein said storage is a static storage of serial or parallel type (ROM, EEPROM, flash storage) or a dynamic storage (RAM).

18. Identifying device according to claim 14, wherein said data processing device comprises at least a microcontroller or a microprocessor.

19. Identifying device according to claim 14, wherein further circuital means are provided, constituted by at least a multipolar electrical connector, adapted to be coupled with said circuital means and connected electrically with processing means through interface means, in order to transmit the informative data stored and processed on said circuital means toward said processing means, so as to identify and manage the same informative data.

20. Identifying device according to claim 19, wherein said informative data are coded as digital data.

21. Identifying device according to claim 19, wherein said circuital means and said further circuital means are housed, included or applied to the nose resting support, or rods or terminal portion or any position of the spectacles, or also on positions outside the spectacles.

\* \* \* \* \*